US00RE37764E

(19) United States
(12) Reissued Patent
Good

(10) Patent Number: US RE37,764 E
(45) Date of Reissued Patent: Jun. 25, 2002

(54) PRODUCT DISPLAY HANGER AND PROCESS

(75) Inventor: David M. Good, Peachtree City, GA (US)

(73) Assignee: Voxcom, Inc., Peachtree City, GA (US)

(21) Appl. No.: 09/496,866

(22) Filed: Feb. 2, 2000

Related U.S. Patent Documents

Reissue of:
(64) Patent No.: 5,728,440
Issued: Mar. 17, 1998
Appl. No.: 08/650,737
Filed: May 20, 1996

U.S. Applications:

(63) Continuation-in-part of application No. 08/318,255, filed on Oct. 5, 1995, now abandoned.

(51) Int. Cl.[7] ..... B65D 85/575
(52) U.S. Cl. ..... 428/40.1; 206/460; 206/806; 248/317; 248/467; 428/41.6; 428/41.7; 428/42.1; 428/42.2; 428/131
(58) Field of Search ..... 428/40.1, 41.6, 428/41.7, 42.1, 42.2, 131, 354, 355, 346; 248/317, 467; 206/800, 460

(56) References Cited

U.S. PATENT DOCUMENTS

| | | | | |
|---|---|---|---|---|
| 3,869,333 A | | 3/1975 | McMaster | 161/39 |
| 3,884,443 A | | 5/1975 | McMaster | 248/467 |
| 4,537,310 A | | 8/1985 | Thul | 206/526 |
| 4,693,441 A | | 9/1987 | Conway | 248/225.1 |
| 4,890,809 A | | 1/1990 | Good | 248/317 |
| 4,896,770 A | * | 1/1990 | Calcerano | 206/806 |
| 4,899,882 A | * | 2/1990 | Benner | 205/806 |
| 4,902,547 A | | 2/1990 | Good | 428/40 |
| 5,020,761 A | | 6/1991 | Good et al. | 248/317 |
| 5,232,388 A | | 8/1993 | Danjell | 445/22 |
| 5,262,216 A | | 11/1993 | Popat et al. | 428/42 |
| 5,728,440 A | | 3/1998 | Good | 428/40 |

* cited by examiner

*Primary Examiner*—Nasser Ahmad
(74) *Attorney, Agent, or Firm*—Eugene Stephens & Associates; Thomas B. Ryan

(57) ABSTRACT

A clear/printed hang tag, a hanging system for suspending a package of products from a single wire hanger and/or a double wire hanger, automatic labeling of product packaging on a billboard, and the process for making hang tags. The hang tag has an opening for receiving a single or a double wire hanger cut near the top of a billboard region containing printed matter. The hang tag is made from a continuous web of polyester film with a process including, printing graphics on the back side of the upper portion using reverse image flexographic printing, coating the printed image with a UV cured, opaque ink coating, a lower portion of the front side with a clear, pressure sensitive adhesive, combining and adhering the continuous web of polyester film to a release liner, die cutting the hang tag shape and the hanger opening, stripping the waste material from the liner, and rewinding the combined hang tags and liner on a reel for shipment to a customer. The package consists of at least two bundled products forming a compact package, wrapped and sealed in a clear, oriented polypropelene shrink wrap film, and the adhering region is pressed against the topmost product and adhered thereto by the adhesive.

6 Claims, 6 Drawing Sheets

PRODUCT DISPLAY HANGER AND PROCESS

Matter enclosed in heavy brackets [ ] appears in the original patent but forms no part of this reissue specification; matter printed in italics indicates the additions made by reissue.

RELATED APPLICATION

This application is a Continuation-In-Part of Ser. No. 08/318,255, filed Oct. 5, 1995, now abandoned.

BACKGROUND OF THE INVENTION

1. Field of the Invention

This invention relates generally to product hangers and more specifically to clear/printed hang-tag construction to be used in automatic labeling of product packaging and a process for making hang-tags.

2. Discussion of the Prior Art

Hang tags are used in large numbers for hanging a wide variety of small products on the wire hangers of sales display racks. The hang tags have an opening, usually in the form of a squat, isosceles triangle, having an apex that can receive a single wire hanger and having a base broad enough to receive a double wire hanger.

Hang tabs are generally adhered to the box or package they support, and are usually formed to fold flat against the package they are adhered to, until the package is removed from a packing case and hung up for sales display.

Labels using pressure sensitive adhesives are well known. In general, pressure sensitive labels involve the label itself, a pressure sensitive adhesive, and a backing sheet upon which the label or labels are mounted. The backing sheet is usually coated with a release coating, such as a silicone, so that the adhesive coated labels may be more readily removed. Various types of adhesives may be used to coat the labels.

Prior art methods of packaging require the product to be packaged in a paperboard box or plastic header bag for display on a hanging rack system. Both of these packaging systems use a considerable amount of material. Prior art packaging generally consists of a wrapper having printed matter describing the product, or a label pasted on a package containing the printed matter. Additionally, a header, having a billboard laminated therein is used to close the top of the package and provides the hanger for a display rack. Furthermore, since the packaging material hides descriptive matter printed on the product, the outer surface of the package must then be printed to duplicate the hidden material.

With the current efforts to reduce the amount of packaging materials used and thus reduce the amount of material reaching landfills, new and more efficient packaging methods are required. The current efforts are to make products and packaging "Green", that is using a bare minimum of recycled and recyclable materials.

One such label is shown in U.S. Pat. No. 5,262,216 to Popat et al which discusses various types of pressure sensitive label assemblies. Labels using pressure sensitive adhesives are well known. In general, pressure sensitive labels involve the label itself, a pressure sensitive adhesive, and a backing sheet upon which the labels are mounted. The backing sheet is usually coated with a release coating such as a silicone so that the adhesive coated labels may be more easily removed. Various types of adhesives may be used to coat the labels. The nature of the adhesive, whether permanent or removable, is often specified by the force required to peel (peel force) a one-inch sample strip at right angles from a stainless steel surface to which it has been adhered. Hot melt adhesives have certain significant advantages over adhesives applied in other ways.

Hang tags, although having many of the qualities of labels, suffer from an additional problem and that is the tendency of pressure-sensitive hangers to peel from the surface to which they are secured, if the article hung is moderately heavy so that there is a constant and substantial pull by gravity. Several prior art hang tags have attempted to resolve these problems.

U.S. Pat. Nos. 4,890,809; 4,902,547 to Good; and 5,020,761 to Good et al disclose various styles of hang tabs. Good (547) discloses hang tabs which are reinforced by adhering a reinforcing band to a head region of a tab strip while the adhesive coated surface of the tab strip is separated from a release liner. The tab strip, with its reinforcing band is then rejoined with its liner and hang tabs with reinforced head regions are die cut so that the tabs are secured in rows on the liner. Good (809) discloses a hang tab folded upon itself, and its hanging region is adhered to its stick-on region so that it lies flat against a package during shipment. The adhesive between the hanging region and the stick-on region is arranged so that the hanging region can be unfolded after shipment to be upstanding from the object for hanging the object on a hanger wire. Good (761) discloses the hanging region of a supporting web of a hang tab adhered to a supported object which is cut and is bendable to form an opening divided between a central region that receives a single wire hanger and end regions that receive a double wire hanger. Uncut tension zones between the central region and the end regions are breakable to receive double wire hangers but remain unbroken to help support the weight of an object hanging on single wire hangers.

U.S. Pat. Nos. 3,869,333 and 3,884,443 to McMaster disclose peel-resistant pressure sensitive hangers. The plastic and its adhesive have sufficient transparency so that the hanger may be secured to a package without concealing any printed matter. In one form the pressure-sensitive elements are coated on both sides except for a very narrow edge, being easily lifted at the edge and then seized and pulled from the web together with a guard piece. In another form, the element is slit so that if the part by which something is hung starts to peel, it will peel past portions which are separated from it so that they do not peel with it.

The present invention provides a less expensive, more efficient, and environmentally acceptable hang tag and method of packaging than any of the prior art methods. Among some of the advantages of the present invention are: an increased display area, the printing is protected by a plastic membrane thus saving a layer of materials, the polyester used for the hang tag may be made from recovered X-ray films, direct adherence to the package, does not cover the package, minimum amount of coatings, increased presentation area, a clear adhesive having high sheer value, reduces the amount of packaging material, and is readily adaptable to automatic application.

SUMMARY OF THE INVENTION

The present invention is a clear/printed hang tag and the process for making hang tags. The hang tag has an opening, in the form of a squat, isosceles triangle for receiving a single or a double wire hanger located near the top of a billboard region (graphics area) containing printed matter.

The hang tag is made from a continuous web of polyester film or other suitable webs of material such as card stock, styrene or polyolefin, with a process including, printing graphics on the back side of the upper portion using reverse image flexographic printing, or other suitable printing process, coating the printed image with a plastic membrane, coating a lower portion of the front side with a clear, pressure sensitive adhesive, combining and adhering the continuous web of polyester film to a liner, die cutting the hang tag shape and the hanger opening, stripping the waste material from the liner, and rewinding the combined hang tags and liner on a reel for shipment to a customer. The billboard containing graphics, provides information normally found on labels, and in addition, the hang tag of the invention also forms a permanent part of a hanging system which includes a bundled, tightly wrapped, compact package of product which uses a minimum amount of packaging material. The tightly wrapped package is fixed firmly or securely in place (tightly) with the use of an oriented polypropylene material which is then "heat shrinked" in a shrink chamber. The resulting product feels like a solid unitary object when packaged in accordance with the invention. In the example of the invention described in this application, the two audio tape cassettes form a solid block with the two tapes pressed together by the shrink wrap.

DESCRIPTION OF THE PREFERRED EMBODIMENT

Figure 1:
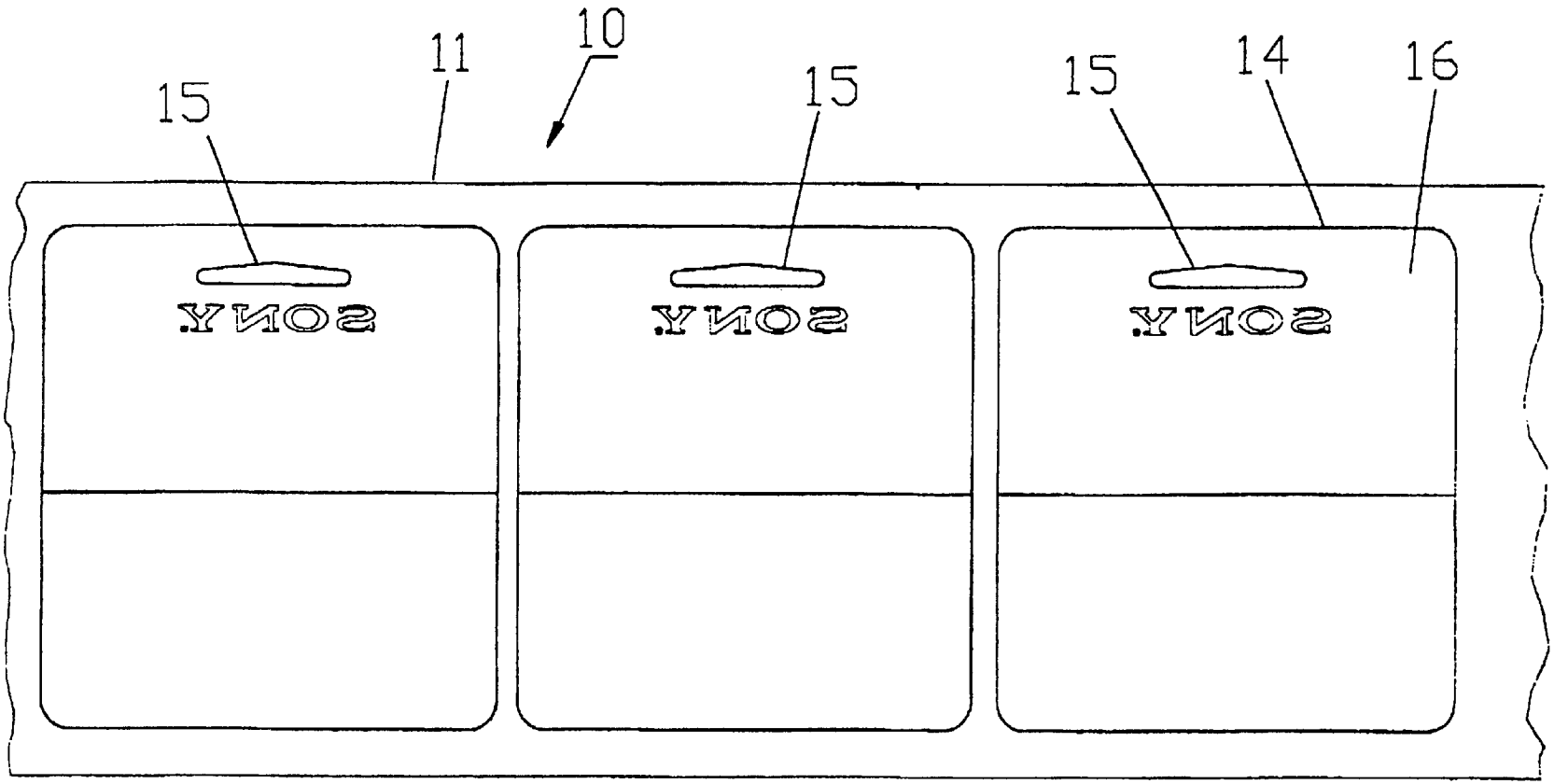
FIG. 1 is a plan view of the back side of a preferred embodiment of a hang tag according to the invention, and showing three printed and die cut tags adhered to a liner.
Figure 2:
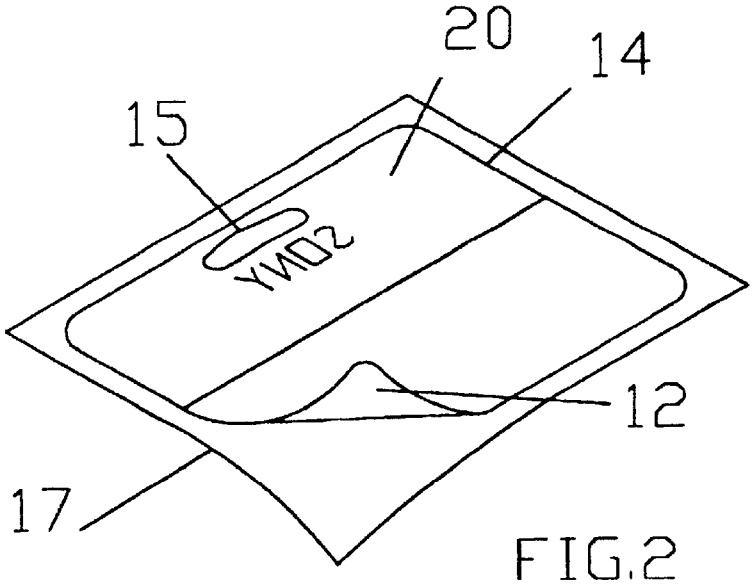
FIG. 2 is a perspective view of a hang tag in accordance with the invention showing one corner peeled upwardly.
Figure 3:
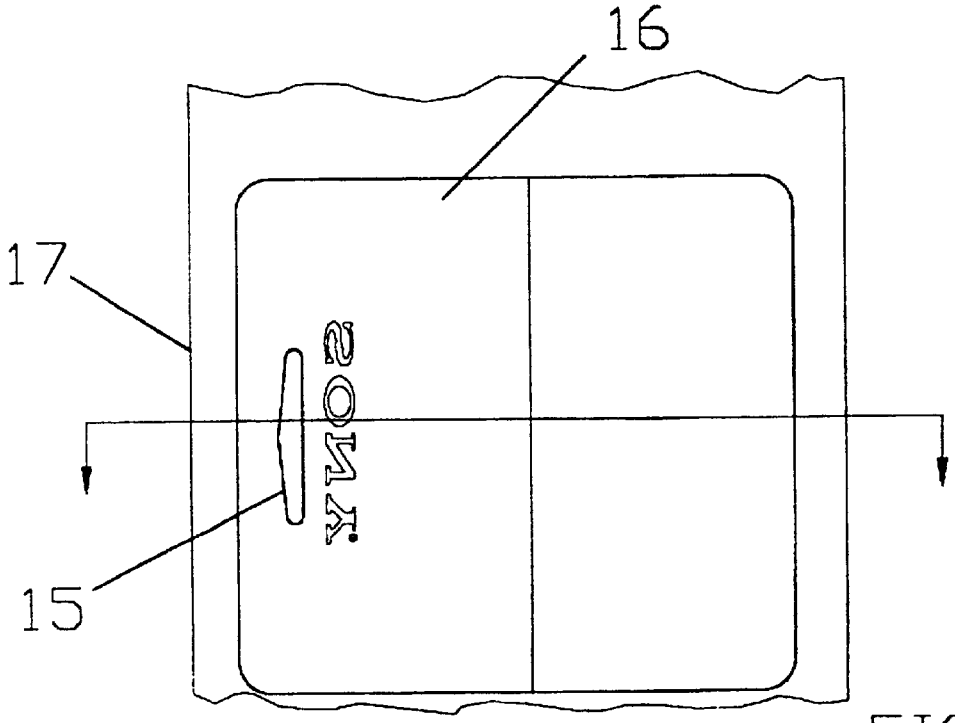
FIG. 3 is a top view of the back side of a hang tag in accordance with the invention.
Figure 4:
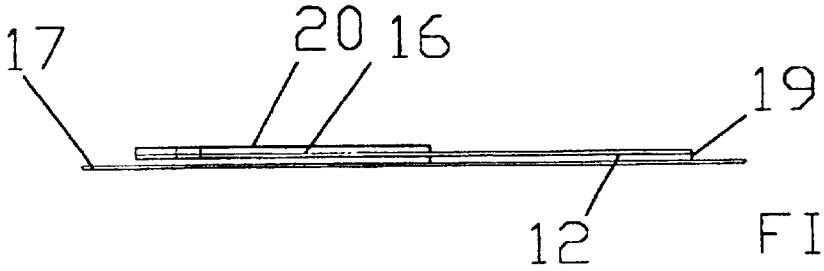
FIG. 4 is a side view, in section, along the line 4—4, of a hang tag in accordance with the invention.
Figure 5:
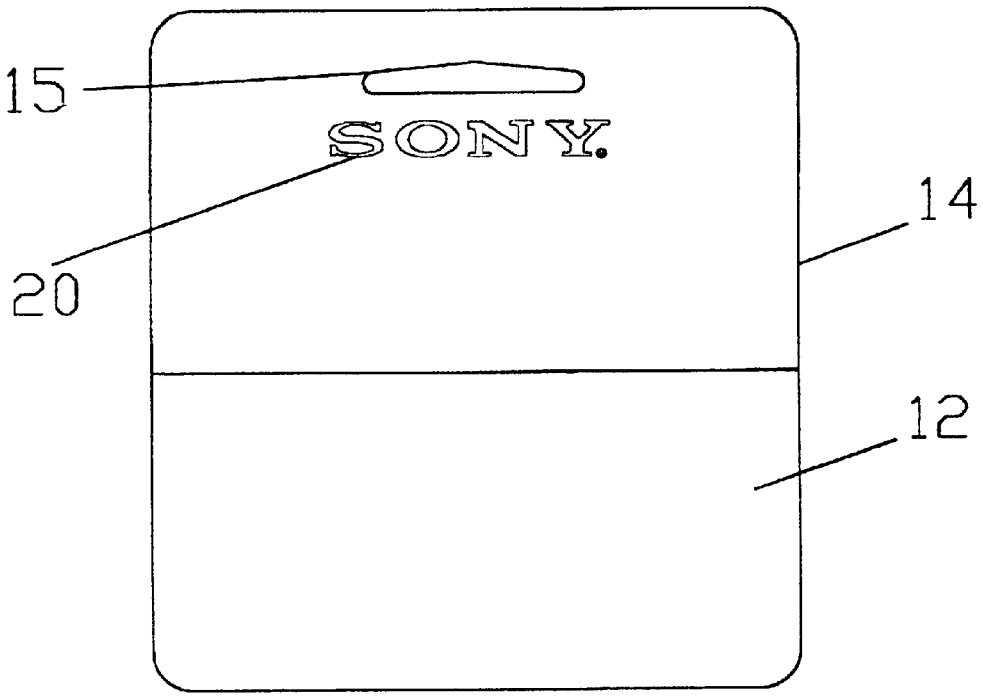
FIG. 5 is a plan view of the front side of a preferred embodiment in accordance with the invention.
Figure 6:
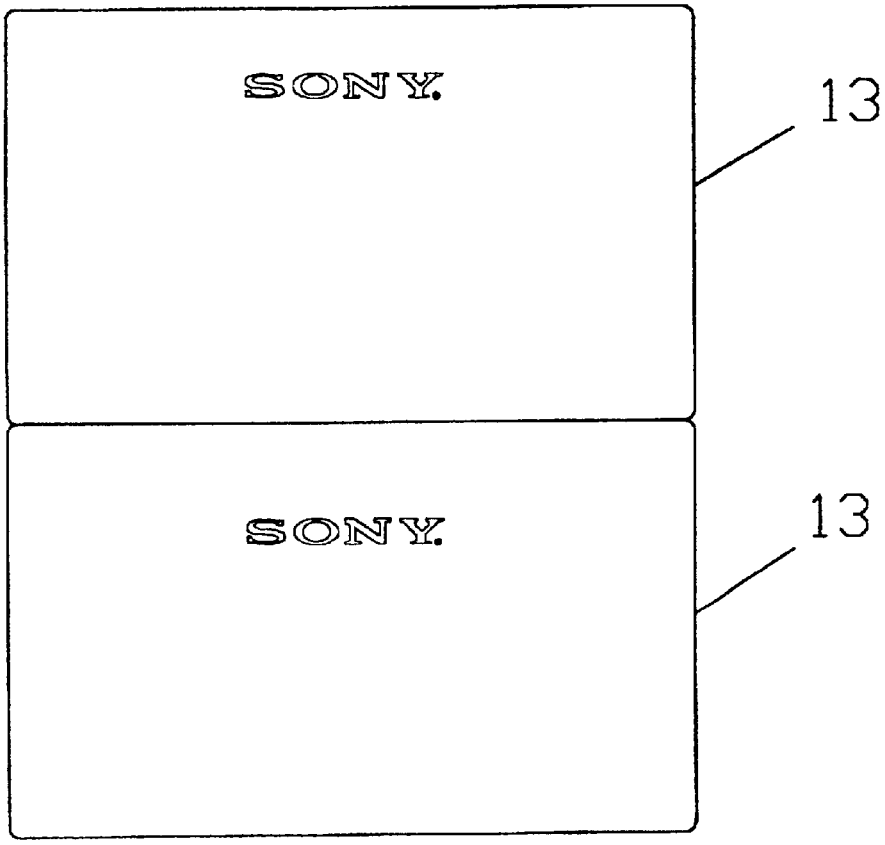
FIG. 6 is a plan view of two individual products to be packaged in accordance with the invention.

The invention comprises a new and novel hang tag 10, having a billboard label containing graphics for sales display, a hanging system for suspending a package of tightly wrapped (shrink wrap) products from a single wire hanger and/or a double wire hanger, and a method of manufacturing hang tags on a multi-color web press.

The hang tag 10 of the invention is preferably formed of a clear, polyester resin face stock 11 having an adhering region on a front side, lower portion 12 where an adhesive is applied to adhere hang tag 10 to an object or package 13, and a hanging region 14 on the upper portion with die cut opening 15 where hang tag 10 can be hung on single or double wire hangers, and a back side upper portion 16 where a billboard containing graphics may be printed for sales display. Die cut opening 15 may remain attached to hang tag 10 by leaving two small uncut attachments (not shown) to permit removal only when required. Normally, merely pushing out the die cut opening 15 is sufficient to break the remaining attachments to remove the die cut opening 15.

Figure 9:
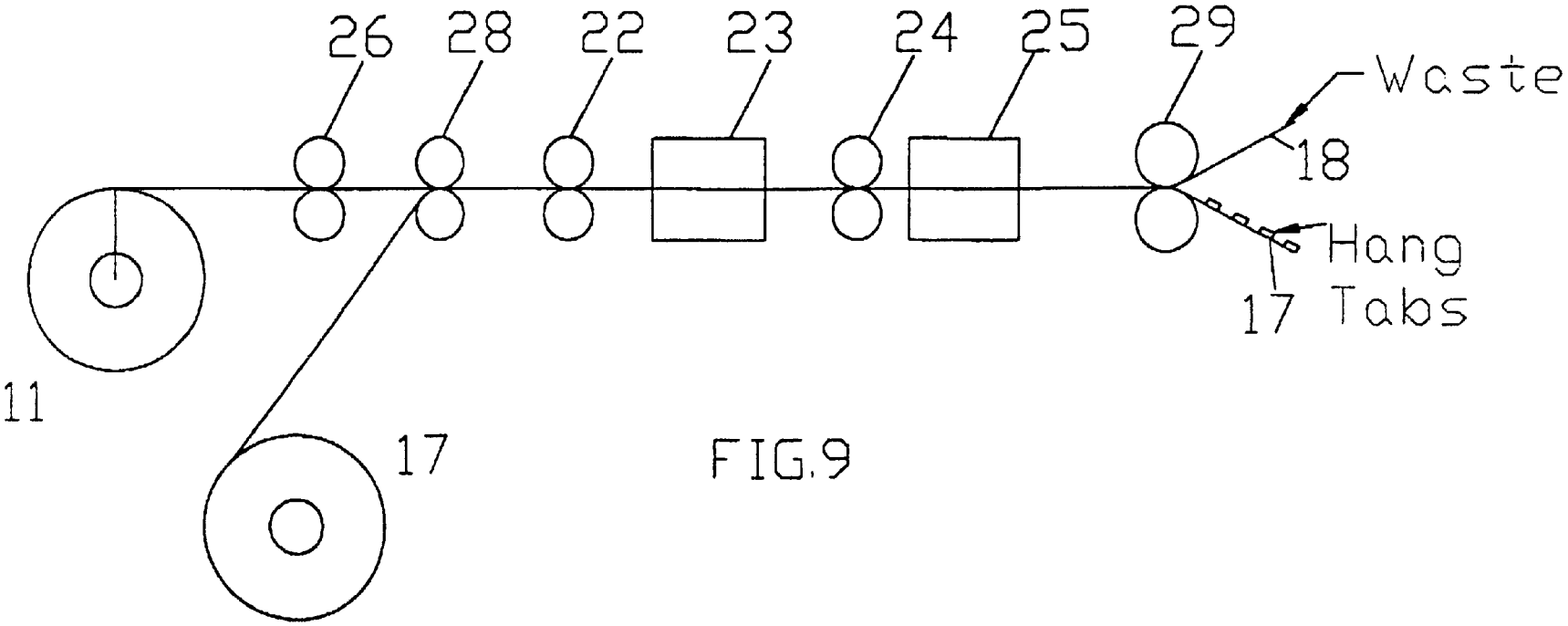
FIG. 9 is a schematic view of a process for making hang tags.

The manufacture of hang tags 10 according to the invention is accomplished on a multi-color web press 21 as shown in FIG. 9, and begins with passing a continuous web face stock 11, of polyester film, or suitable webs of material such as card stock, styrene or polyolefin, through a first printing section 22 and the advertising or instructional information is printed on the back side 16 (billboard) of hanging region 14 using reverse image flexographic printing. In the process, the printed matter 20 is applied to what is regarded as the back side 16. In a preferred embodiment, water soluble inks were used in order to provide a safer work area for the employees in the manufacture of hang tags 10 and also to manufacture a product that is totally recyclable. The next step passes the printed area through a dryer section 23. Additional printing and drying stations may be added as desired.

The next step in the process applies a thin UV cured opaque ink at printing section 24 to protect the printing from damage when being displayed. The final coating is usually a white color to provide an easily visible contrast. The next step is to dry the final coating through a dryer section 25. When the printing and drying steps are completed, face stock 11 is passed through hot melt adhesive applicator 26 and coated at a front side, lower portion, adhering region 12, with a 0.75 Mil coating of a clear, pressure sensitive, adhesive. The web is then passed through a dryer section 27.

After the printing and adhesive application steps are completed, the face stock 11 is combined with release liner 17 between a set of combining rollers 28, and then passed through a set of die cut rollers 29 where the hang tags 10 are cut to shape. The release liner 17, combined with the hang tags 10, are then prepared for automatic application in a manner well known in the art. Waste material 18, cut from around each hang tag 10, is removed from release liner 17 as generally known in the hang tag art.

Figure 7:
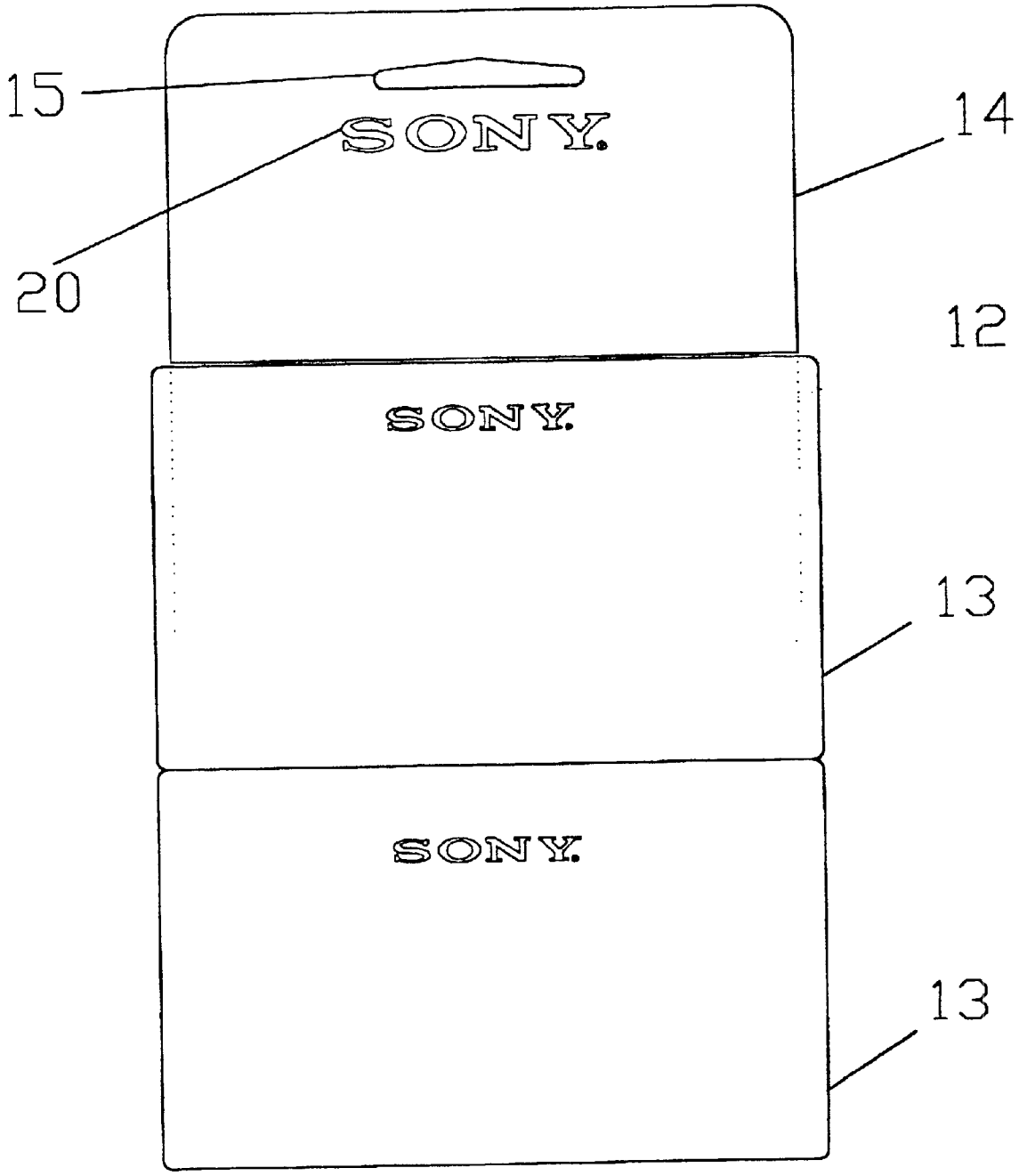
FIG. 7 is a front plan view of packaged products with the hang tag of the invention affixed to the back side.
Figure 8:
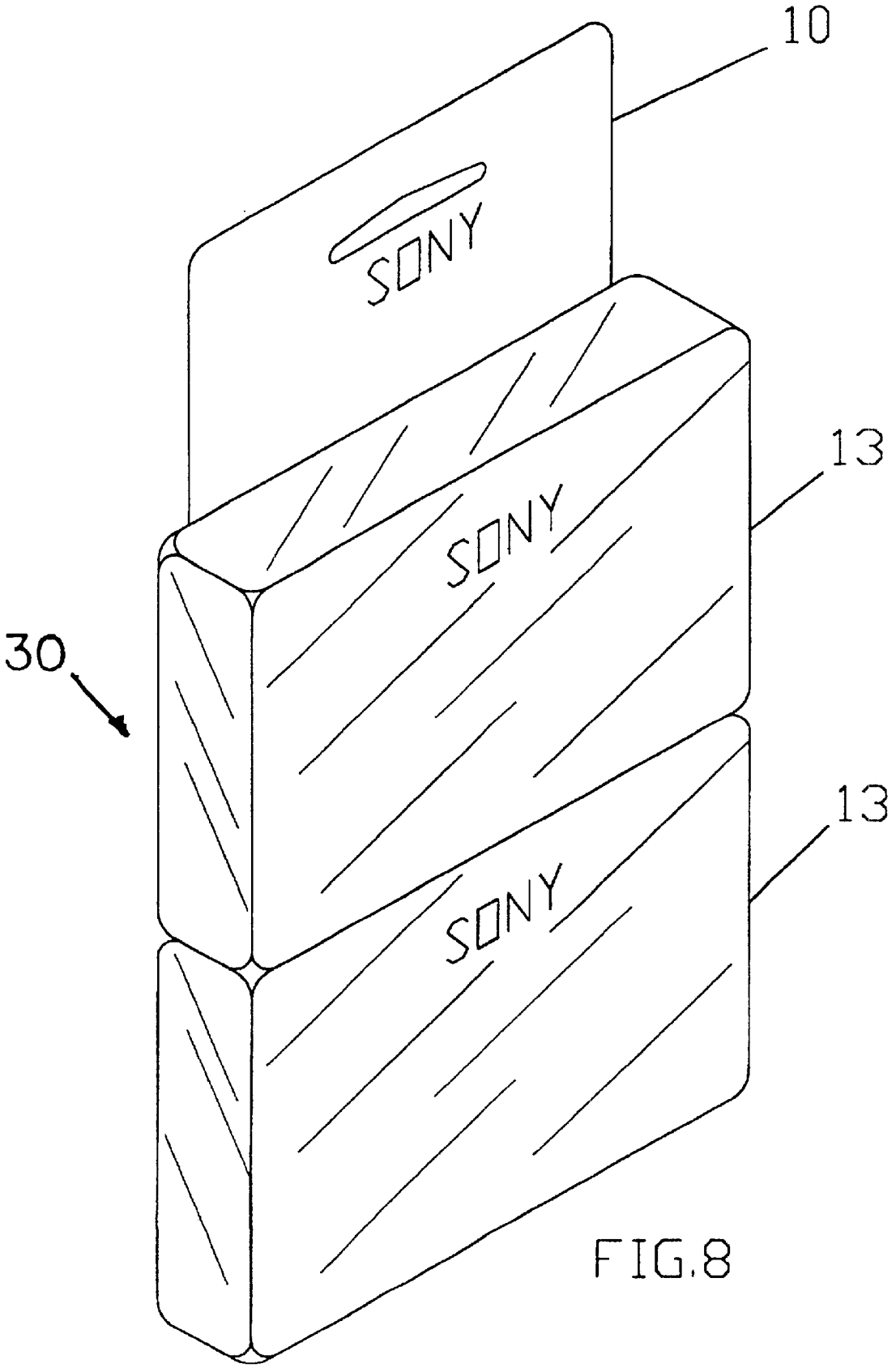
FIG. 8 is a perspective view of packaged products with the hang tag of the invention affixed to the back side, the shading depicting the transparent packaging material.

As shown in FIGS. 5 through 8, two products 13 are assembled and wrapped tightly in a clear plastic "shrink wrap" film 30 which may be an oriented polypropylene. The film 30 wrapped around the product material is "L-Bar" sealed and then shrunk in a 200°F.–250° F. shrink chamber. After separating hang tag 10 from release liner 17, the adhering region 12 is pressed against the topmost packaged product 13 and adhered thereto by the adhesive. FIG. 8 is a perspective view of a bundle of packaged products 13 with the hang tag of the invention affixed to the back side. The clear plastic film 30 is shaded to depict transparency. The example of a package of products 13, as shown assembled in FIGS. 7 and 8 are audio cassette tapes which contain a great deal of technical printed matter. Because of the transparent nature of the hang tag 10 and the transparency of the plastic film 30 wrapper holding the two products 13 together, all of the technical information printed on the products 13 is clearly visible. With the reverse image printing on the back side 16 (billboard), the printed matter 20 is protected and presents an attractive impression because of the glossy surface of the polyester material of the hang tag 10.

The outer dimensions of hang tag 10 are preferably between 3½" to 4" wide and 4" to 4½" high. The final shape is determined by the size of the product to be packaged. In a specific example of hang tag 10, the outer dimensions were 4 inches wide and 4¼ inches high. The face stock 11 material was a 7 mil polyester film. The material is a super clear rigid printable film for graphic hanging applications that resists elongation and distortion. The release liner 17 was a 2.0 mil silicone coated biaxially oriented polypropylene film that exhibits consistent release properties and is extremely resistant to tearing and breaking. The liner is ideal for high speed auto applications.

The adhesive 19 used was a permanent, pressure sensitive adhesive designed for adhesion to polypropylene PVC and Olefin materials. Initial adhesion is high and builds to permanent bond with high shear strength. The coat weight typical value was 0.75 mil. A typical value of a 90° degree peel was 1,400 grams/inch. A 180° peel was 1,800 grams/inch.

In summary, the instant invention has been designed to provide all of the required characteristics of sound packaging and product display while providing an economical, effective, packaging and advertising medium which utilizes recycled materials and is recyclable itself. The invention is recyclable because of the unique combination of recyclable materials, including the inks and adhesives, and is not a laminate of dissimilar materials which are not recyclable. Furthermore, the compactness of the package 13 and hang tag 10 reduces the amount of packaging material required for shipping the product to the retailers, and thus provides an additional savings in materials and natural resources. The clear release liner 17, designed for automatic application by the product manufacturer, is also recyclable.

While the invention has been explained with respect to a preferred embodiment thereof, it is contemplated that various changes may be made in the invention without departing from the spirit and scope thereof.

What is claimed is:

1. A hanging system for suspending a package of products from a single wire hanger and/or a double wire hanger and for automatic labeling of product packaging, said hanging system [consisting of] *comprising*:

a hang tag formed of [recyclable,] transparent, sheet resin[,] material and having a front side and a back side, an upper portion and a lower portion, a hanging region and a billboard region on said upper portion of said hang tag, said hanging region having one opening in the form of a squat, isosceles triangle for engaging a single or a double [hanger] wire *hanger,* a back side of said upper portion having said billboard region having an image containing graphics or advertising material printed on said upper portion of said back side, and covered with an [ultraviolet cured,] opaque ink coating for protecting said graphics or advertising material, and, an adhering region on said lower portion *of the* front side, said adhering region having a [0.75 Mil] coating of a clear, [hot melt,] pressure sensitive adhesive.

2. The hanging system of claim 1 wherein said hang tag is formed from a 7 mil transparent, polyester film, face stock, said graphics or advertising material [consists of] *comprises* a reverse image, water soluble ink, and said face stock is combined with a release liner for shipping and automated application on packages.

3. A hanging system of claim 1 wherein the package [consists of] *comprises* a package of two products wrapped together as a bundle in a clear, oriented polypropylene shrink wrap film, and said adhering region is pressed against the topmost product and adhered thereto by said adhesive, thereby forming a recyclable, packaging and advertising medium.

4. A hanging system in combination with a package of products suspended from a single wire hanger and/or a double wire hanger and for automatic labeling of product packaging, said hanging system [consisting of] *comprising*:

a hang tag formed of a [recyclable,] transparent, [7 Mil polyester] film and having a front side and a back side, an upper portion and a lower portion, a hanging region and a billboard region on said upper portion of said hang tag, said hanging region having one opening in the form of a squat, isosceles triangle for engaging a single or a double [hanger] wire *hanger,* a back side of said upper portion having said billboard region having an image containing graphics or advertising material printed on said upper portion of said back and covered with an [ultraviolet cured] opaque ink coating for protecting said graphics or advertising, an adhering region on said lower portion *of the* front side, said adhering region having a [0.75 mil] coating of a clear, [hot melt,] pressure sensitive adhesive, a sealed package of at least two products wrapped together, end to end, as a bundle, in a transparent, [oriented polypropelene] shrink wrap film, and said adhering region being pressed against one [end of one product] *of the products* and adhered by said adhesive, thereby forming a hanging, packaging and advertising medium.

5. The hanging system of claim 4 wherein said polyester film [consists of] *comprises* a clear sheet resin face stock material 3½" to 4" wide and 4" to 4½" high, and said billboard is printed using reverse image flexographic printing, and water soluble inks.

*6. A hanging system to suspend a packaged product from a wire hanger and for automatic labeling of the packaged product, the hanging system comprising:*

*a hang tab formed from a transparent resin material having a front side and a back side and an upper portion and a lower portion,*

*an adhering region located on the front side of the lower portion of the hang tab,*

*a pressure-sensitive adhesive applied to the adhering region for adhering the packaged product to the hang tab,*

*a hanging region located on the upper portion of the hang tab having an opening formed through the front and back sides of the hang tab for engaging the wire hanger, and*

*a billboard region also located on the upper portion of the hang tab having (a) an image containing graphics or advertising material that is printed on the back side of the upper portion of the hang tab and that is visible through the front side of the hang tab and (b) an opaque background coating covering and protecting the graphics or advertising material on the back side of the hang tab.*

* * * * *